United States Patent [19]

Myers et al.

[11] 4,337,786
[45] Jul. 6, 1982

[54] VARIABLE RATE FERTILIZER INJECTION SYSTEM

[75] Inventors: Richard G. Myers; James P. Stuckey, both of Fremont, Nebr.

[73] Assignee: Valmont Industries, Inc., Valley, Nebr.

[21] Appl. No.: 162,085

[22] Filed: Jun. 23, 1980

[51] Int. Cl.³ ............................................. G05D 11/13
[52] U.S. Cl. .......................................... 137/3; 137/98; 137/101.21; 137/552.7
[58] Field of Search ................. 137/101.21, 98, 551, 137/552.7, 3

[56] References Cited

U.S. PATENT DOCUMENTS

| | | | |
|---|---|---|---|
| 2,726,895 | 12/1955 | Behlen | 299/49 |
| 3,326,232 | 6/1967 | Stamps et al. | 137/344 |
| 3,335,671 | 8/1967 | Schoenecker et al. | 103/150 |
| 3,375,976 | 4/1968 | Stamps et al. | 239/10 |
| 3,455,321 | 7/1969 | Flynn | 137/101.21 |
| 3,669,357 | 6/1972 | Overbey | 239/310 |
| 3,770,198 | 11/1973 | Mihara | 239/10 |
| 3,806,037 | 4/1974 | Loewenkamp | 239/310 |
| 4,007,755 | 2/1977 | Lerner et al. | 137/101.21 |
| 4,121,767 | 10/1978 | Jensen | 239/71 |

Primary Examiner—William R. Cline
Attorney, Agent, or Firm—Rogers, Eilers & Howell

[57] ABSTRACT

A variable rate injection system includes a paddle wheel flowmeter which produces a pulse train proportional to the amount of liquid flowing through an irrigation line. An accumulator circuit totalizes the pulse train and produces a triggering pulse to a flow control timer after a predetermined amount of fluid has passed through the irrigation line. The triggering pulse activates an adjustable time delay output on the flow control timer and its timed contact closure electrically operates a solenoid valve in an injection line. A constant displacement injection pump maintains an additive under pressure in the injection line and the solenoid valve, when opened, permits flow of the additive through the injection line and into the irrigation line. When the solenoid is closed, a pressure relief valve and relief line permit return of the additive to a reservoir. A safety shutdown includes a flow sensor mounted in the injection line between the normally closed solenoid and the main irrigation line. This flow sensor incorporates a SPDT (Single Pole Double Throw) switch which is used to reset one or two delay timers as the sensed condition alternates between flow and no flow. Should the flow sensor fail to detect a change from flow to no flow, or vice versa, within a specified time limit, one of the two timers will time out, triggering a relay and shutting down the fertilizer pump, the pivot system, and the water supply.

7 Claims, 2 Drawing Figures

VARIABLE RATE FERTILIZER INJECTION SYSTEM

BACKGROUND AND SUMMARY

Agricultural irrigation units are in wide use throughout various parts of the United States to supplement inadequate rainfall and provide the necessary supply of water to grow crops. Most of these agricultural irrigation units utilize some sort of pipeline system to transport water from a water source to the field. There are various different kinds of designs such as center-pivot units, end roll systems, etc. as is known in the art and these generally have a main supply line which moves through the field as the water is applied to the land.

It is often desirable, and even necessary, to supply additives including fertilizers or other chemicals to enhance the growth of crops in what otherwise may be a dry, mineral-poor soil. An ideal way to apply these chemicals is to utilize the irrigation unit as it moves through the field. By using the irrigation systems, the fertilizer or chemical is applied throughout the same area as the water so that it is delivered to that portion of land growing crop. In addition, the water serves as a medium to transport the chemical and with a sufficient mixing and balanced application pattern, accurate proportions of additive may be applied with hardly any waste.

Another advantage to using the irrigation system is that the chemical may be applied at no additional cost as the irrigation system must sweep through the field in any event and it costs no more in equipment or in usage if instead of applying merely water, a mixture of additive and water is applied. The only additional cost is for the equipment to pressurize and inject the chemical into the main pipeline and ensure that it is being injected in the proper proportion to the amount of water flowing through the system. Thus, for what may be a very small amount compared to the cost for the entire irrigation system, a very desirable feature may be added which allows the direct application of fertilizers or other additives to the field in a controlled, proportional amount.

In the prior art, systems have been developed and used for injecting an additive at a constant rate which is calculated to match the expected rate of flow of water through the irrigation system. In these systems a constant displacement pump injects the additive into the system at a constant flow and pressure as the system sweeps through the field. While the prior art systems work relatively well for those applications in which the application rate remains relatively constant, these systems do not provide any means to vary the rate at which the additive is injected into the system as is required when the flow of water through the main irrigation system is altered. For example, in a center-pivot irrigation system which sweeps through a circular area, corner systems are often provided to at least partially irrigate the corner areas of a square of land. As can be appreciated, the corner system is only operable for a portion of the sweep through the field, i.e. when the system is adjacent any one of the four corners of a square field. Examples of a corner system owned by the same assignee as herein are Daugherty, et al., U.S. Pat. No. 3,902,668 and Seckler, et al., U.S. Pat. No. 3,802,627, the disclosures of which are incorporated herein by reference. When the corner system is on, the flow of water through the system is stepped up to maintain a constant water application for the increased amount of land being watered. Thus, an irrigation system having a corner unit experiences several changes in flow rate through a single cycle.

For any irrigation system which has a varying flow of water, the prior art systems were found to be undesirable as the proportionate mix of additive in the system varied as the flow varied. With a prior art system, a farmer had to choose between either over-fertilizing when the corner system was non-functional; under-fertilizing when the corner system was functional; or some unhappy medium between the two. This has recently become more of a problem as the cost of fertilizers and chemicals has risen dramatically making over-fertilizing very expensive. Furthermore, some types of crops and chemical combinations show up the improper use of fertilizers very dramatically such that the prior art systems are ineffective in full utilization of the growing capabilities of the field.

To solve these and other problems, applicants have succeeded in developing a system for accurately measuring the rate of water flow through the main irrigation line and periodically injecting a measured amount of chemical into the line. As the rate of water flow increases, the number of times the chemical is injected increases to maintain the preset proportional mix of chemical and water. Similarly, as the flow decreases, the number of injections decreases. The system uses a paddle wheel type flowmeter to measure the instantaneous flow rate of the water. This flowmeter also provides a totalized output which supplies a triggering pulse to a flow control timer circuit after a predetermined amount of water has passed through the system. The timer then opens a solenoid for a preset period of time, thereby injecting a predetermined amount of additive into the irrigation line. By using a scheme which changes the number of injections of a constant amount of chemical produced at a constant pressure, a less expensive constant displacement pump may be used, as in the prior art systems. A pressure relief valve and relief line return the additive to a reservoir between timed openings of the solenoid to permit continuous operation of the pump without damage to the system. A safety shutdown prevents either a continuous-on or continuous-off condition by sensing the output of the injection line, timing the on and off conditions, and shutting the system down should either of those timed conditions exceed the normal operating time periods.

Thus, applicants' system automatically varies the amount of additive injected into the main irrigation line by "pulsing on" the injection system for a preselected time period after a predetermined amount of liquid has flowed through the system. This ensures that the proper amount of fertilizer or the like is applied through all parts of the field and at varying water application rates caused by corner system cycling or the like. Applicants' system is more fully explained in the drawings and preferred embodiment which follows.

DETAILED DESCRIPTION OF THE PREFERRED EMBODIMENT

Figure 1:
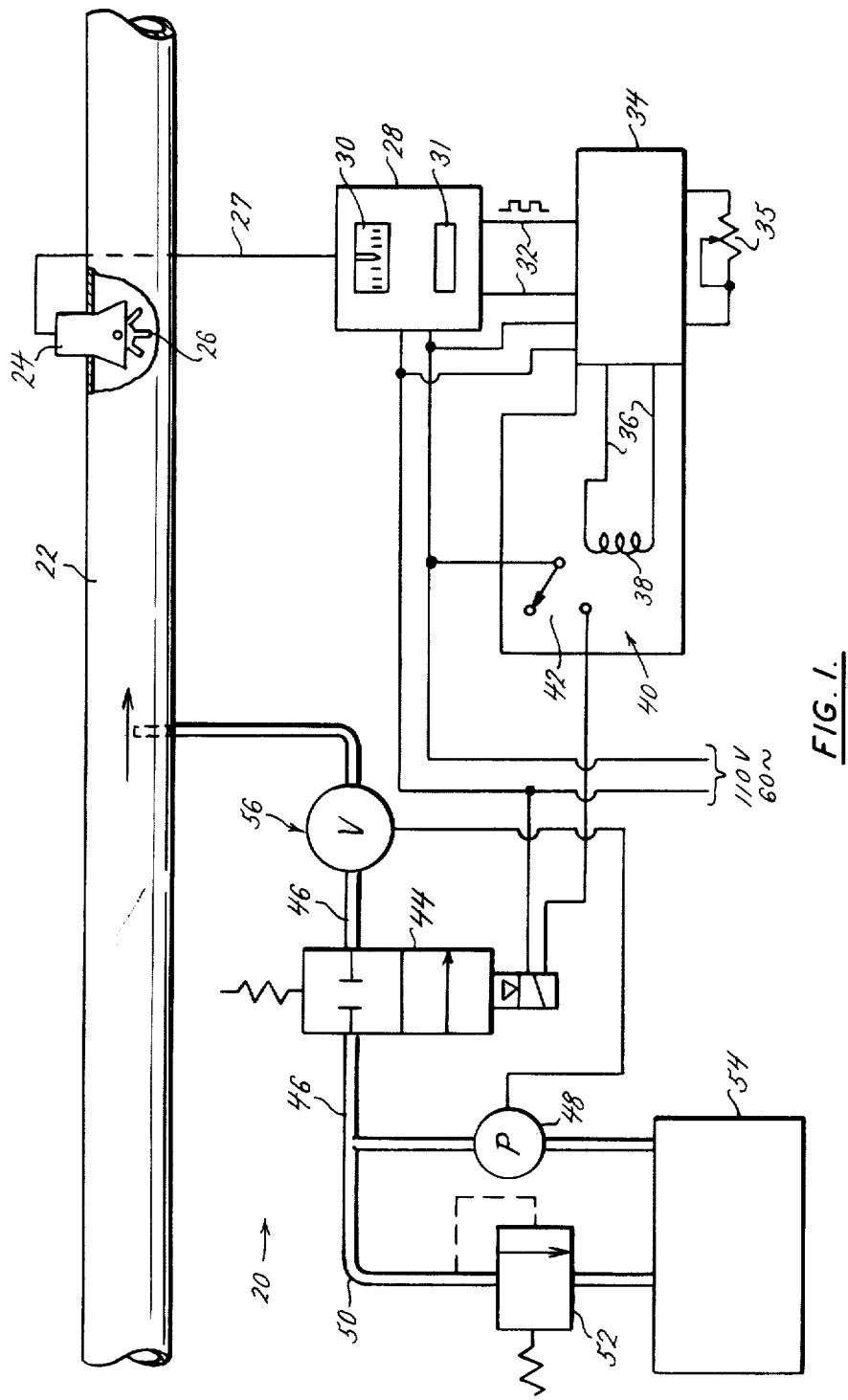
FIG. 1 is a schematic representation of applicants' injection system.

Applicants' variable rate injection system 20 is shown in FIG. 1 connected to the main irrigation line 22 of an irrigation system, as is known in the art. The irrigation system 22 may be of any well known variety including center-pivot, end roll, etc. A paddle wheel flowmeter 24 is mounted on the main irrigation line 22 and extends in to the approximate center of the line 22, as shown in the drawing. A paddle wheel 26 on paddle wheel flowmeter 24 rotates at a rate directly proportional to the rate of liquid flowing through line 22 and generates an electrical pulse train which is transmitted through line 27. A flowmeter instrument monitor 28 receives the signal generated by the paddle wheel transducer 26 and provides both a visual display 30 for an instantaneous reading of the water flow rate and an accumulator section which indicates totalized gallonage on display 31. The accumulator section of monitor 28 also provides a train of electrical pulses along output lines 32 to a flow control timer 34 which is directly related to the rate of flow. The pulse train may have a frequency, phase, digital code or other relationship which conveys flow information to the flow control timer 34. In applicants' preferred embodiment, a combination of pulse frequency and digital coding are used to communicate flow rate.

After a predetermined number of pulses have been totalized in the accumulator section of the monitor 28 indicating a predetermined quantity of fluid has flowed by the paddle wheel 24, the flow control timer 34 will activate a time delayed output circuit 40 via lines 36 which, in effect, closes an electrical contact 42. The output section 40 which is illustrated as "contacts" 42 and "coil" 38 may either be of an electromechanical or a solid state nature. The output circuit 40 will remain activated and continue to hold its "contact" 42 closed for a preset time period which is determined by the variable resistor 35 on the flow control timer 34. The closure of "contact" 42 completes the circuit to normally closed (N.C.) solenoid valve 44, thereby opening it for the time period set by variable resistor 35. The N.C. soldnoid valve 44 controls the flow of additive through injection line 46 into the main irrigation line 22. To aid in mixing of additive with water, injection line 46 extends in to the approximate center of irrigation line 22 so that additive is injected into the main stream of water. Injection line 46 is pressurized by pump 48, a constant displacement injection pump sized to suit the requirements of the particular irrigation system being served. A relief line 50 and a pressure relief valve 52 provide a bypass for additive to flow back into reservoir 54 whenever the N.C. solenoid valve 44 is closed.

Figure 2:
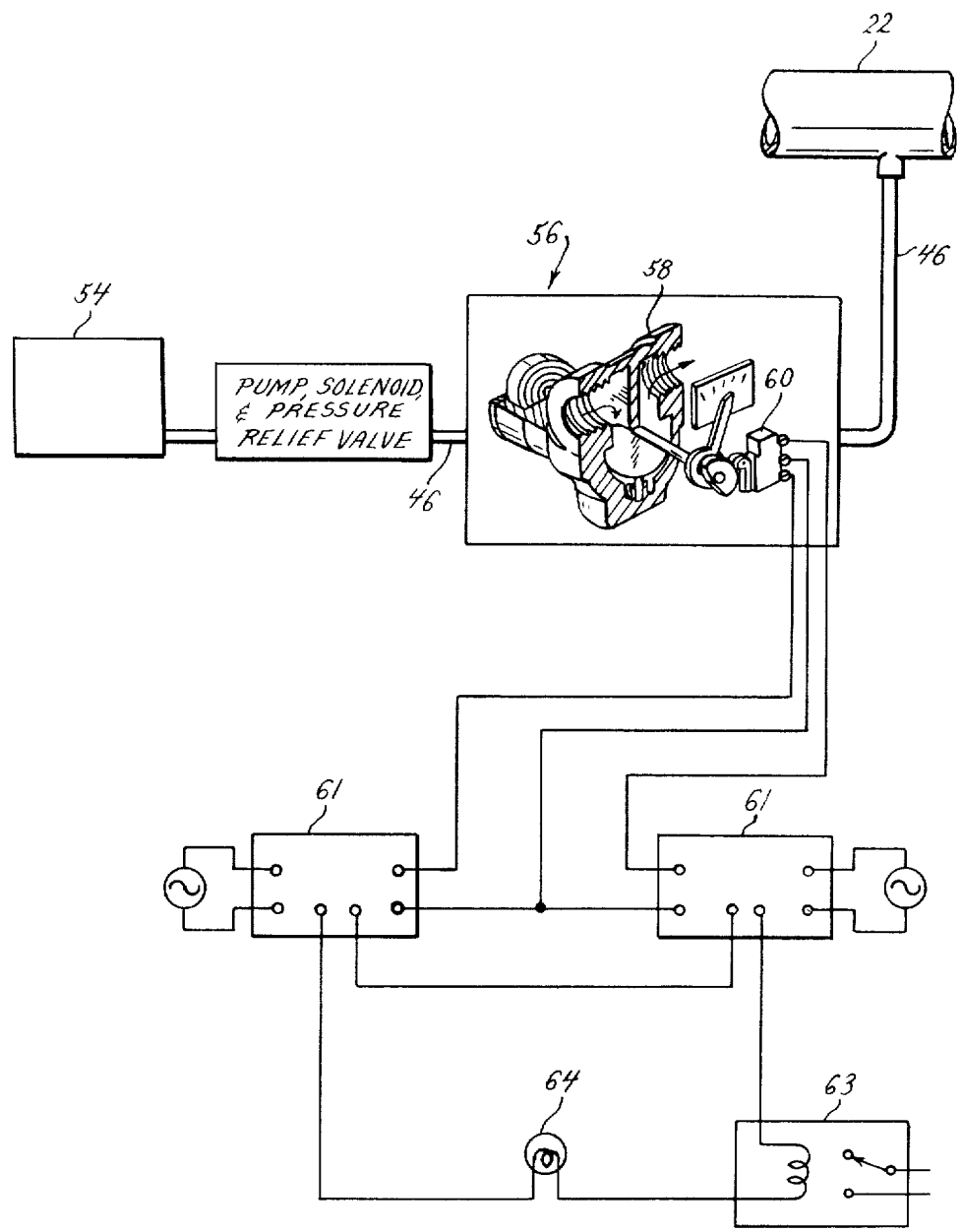
FIG. 2 is a schematic layout of the safety shutdown portion of applicants' system.

A safety shutoff 56 is provided in injection line 46 to shut the entire system down should N.C. solenoid valve 44 fail to open or to close, causing a continuous-on or continuous-off condition. The safety shutoff 56 is shown more fully in FIG. 2 and includes a flow sensor 58 which senses the flow in injection line 46. Flow sensor 58 incorporates a SPDT switch 60 which is connected to one or more delay timers 61. As the sensed condition in injection line 46 changes from flow to no flow and back, the SPDT switch 60 alternately resets the delay timers 61. Should the flow sensor 58 fail to detect a change from flow to no flow, or vice versa, within a specified time limit, a timer 61 will time out, triggering a relay 63 and shutting down the fertilizer pump 48, the irrigation system 22, and the main water supply pump (not shown). A pilot light 64 or the like may be illuminated to indicate the cause of the shutdown, and/or an alarm may be sounded to alert the farmer of a safety shutdown condition.

OPERATION

As is evident from the preceding description of applicants' variable rate injection system, a premeasured amount of additive is injected into an irrigation line as water flows therethrough. Applicants' system is characterized in that a high pressure "slug" of additive is injected with a variable interval between slugs. In this way, a complete mixing is ensured as the slug is injected into the system under a high pressure and causes turbulence within the main irrigation line. Applicants' system varies the injection rate by varying the number of "slugs" per unit of time and not by changing the size or pressure of the "slug". This eliminates the use of smaller orifices which would be more likely to clog and lower pressures which would lead to less complete mixing. Furthermore, the injection of a slug at a high pressure tends to clean out the injection line and additives having higher viscosity may therefore be used in applicants' system. As a further aid to mixing, applicants' injection line extends approximately halfway into the main irrigation line such that the additive is introduced into the line at the approximate cross-sectional center thereof.

Applicants' system is calibrated by first adjusting the pump flow rate and then fine tuning by changing the timed injection period or "slug" length with the flow control timer. However, fine tuning of the "slug" length must be within limits necessary to maintain a minimum off period for resetting of the flow control timer between triggering pulses. The minimum amount of time between "slugs" of additive is first calculated from the maximum flow rate of the irrigation system. This is the flow control timer's upper limit. The flow control timer, which controls the length of the slug injection period, is then initially set at approximately one second less than this value. Now knowing the time length of each slug and the desired injection value, the pump injection rate can be calculated. The injection pump is then set as close as possible to this value, and then the flow control timer setting is used to fine tune the slug size to the exact desired value. However, the final flow control timer setting must always be less than its upper limit. This avoids a second triggering pulse occurring before the flow control timer's delayed output has "timed out", resulting in the second triggering pulse not being sensed and a "slug" of additive being missed.

A complete cycle of operation of applicants' method for maintaining a constant proportional mix of an additive in a liquid carrying irrigation line as the flow of liquid therethrough varies includes the steps of first measuring the rate of flow of liquid through the irrigation line by use of the paddle wheel flowmeter. The paddle wheel flowmeter generates an electrical pulse train which is received by the flowmeter instrument monitor and displayed as an instantaneous flow rate. This pulse train is also applied to an accumulator section in the flowmeter instrument monitor. The accumulator section counts the incoming pulse train and generates a triggering pulse indicating that a predetermined amount of liquid has flowed through the line. Accumulator circuitry as is used in applicants' invention is well known in the art. This triggering pulse is then applied to the flow control timer which upon actuation provides a time delayed output with an on period preset by an adjustable control. This adjustable time delayed output opens a flow control solenoid valve in the injection line. The injection line is under a constant pressure from a pump so that a measured amount of additive is injected through the solenoid and into the irrigation line in response to the triggering pulse. This process is continued and automatically adjusted for varying flow rates in the main irrigation line, although the same "slug" of additive is injected each time into the irrigation line. For faster flow rates, the injection cycle is repeated more often than with slower flow rates.

Various changes and modifications would be apparent to one of ordinary skill in the art as taught by applicants' disclosure. These changes and modifications are included within the teaching of applicants' invention as applicants intend their invention to be limited only by the scope of the claims appended hereto.

What is claimed is:

1. A system for injecting an additive into a liquid carrying irrigation line to maintain a constant proportional mix of said additive as the flow of liquid therethrough varies and shutting the system down upon failure of the injection system including means for measuring the rate of liquid flow in the irrigation line, means responsive to the flow measuring means to produce a triggering pulse indicating that a predetermined amount of liquid has flowed past the flow measuring means, means responsive to the triggering pulse to inject a predetermined amount of additive into the irrigation line, and means to shut the system off should the time between injections vary from a preselected range, said system shutoff including a flow sensor mounted in the injection line, and a timing means connected to the output of the flow sensor so that a timing means circuit operates should the flow sensor output fail to cycle within a preselected period of time.

2. The device of claim 1 wherein the injection means includes an injection line communicating with the irrigation line, a solenoid valve in the injection line, and means to open the solenoid valve in response to the triggering pulse for a predetermined amount of time.

3. The device of claim 2 further comprising a constant displacement pump for pressurizing the additive in the injection line, a reservoir containing the additive, a relief line communicating with the injection line and the reservoir, and a pressure relief valve in the relief line so that additive is returned to the reservoir when the solenoid in the injection line is closed.

4. The device of claim 1 wherein the means responsive to the triggering pulse includes an adjustable time delay circuit, said time delay circuit opening a solenoid valve for a predetermined length of time in response to each triggering pulse.

5. The device of claim 4 wherein the flow measuring means includes a paddle wheel flowmeter which produces a pulse train in response to the speed of the paddle wheel, and wherein the pulse producing means senses the output of said flowmeter and closes a circuit after a predetermined number of pulses are received.

6. The device of claim 5 wherein the injection line extends into the irrigation line and to its approximate center to aid mixing of the additive with the liquid.

7. A method for injecting an additive into a liquid carrying irrigation line to maintain a constant proportional mix of said additive as the rate of liquid flow therethrough varies and shutting the system down upon failure of the injection system including the steps of measuring the rate of liquid flow in the irrigation line, producing a triggering pulse indicating that a predetermined amount of liquid has flowed through the line, injecting a predetermined amount of additive through an injection line and into the irrigation line in response to the triggering pulse, opening a solenoid in the injection line to permit a predetermined amount of additive to flow therethrough, continuously pumping the additive into the injection line, returning the additive to a reservoir through a pressure relief valve and line when the solenoid is closed and shutting the system down should the time between injections vary from a preselected range including sensing the rate of additive flow in the injection line, timing the on and off periods of additive flow, and operating a contact should the on or off period exceed a predetermined limit.

* * * * *